Nov. 7, 1939. A. L. KITSELMAN, 2D 2,179,188
DINING TABLE RECEPTACLE
Filed May 5, 1936
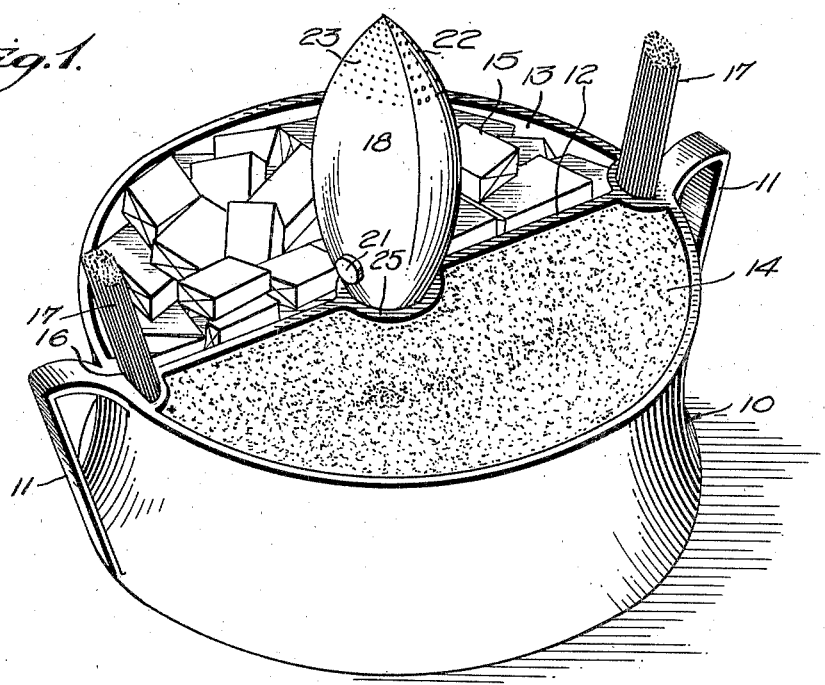
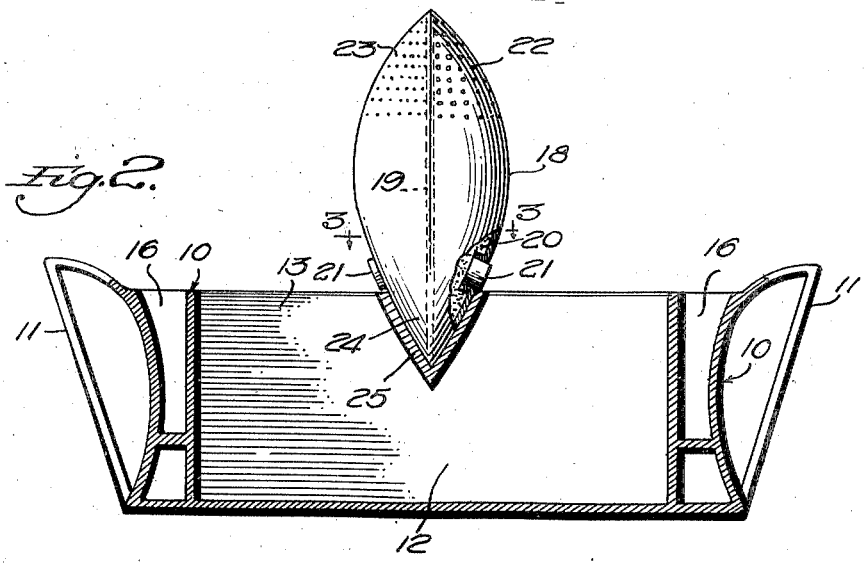
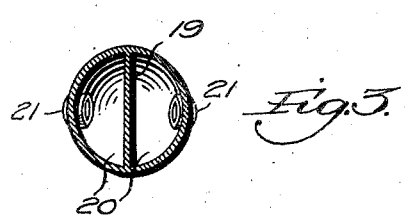
Inventor
A. L. KITSELMAN II
By
Attorney Patented Nov. 7, 1939

2,179,188

UNITED STATES PATENT OFFICE 2,179,188

DINING TABLE RECEPTACLE

Alva L. Kitselman, II, Palo Alto, Calif.

Application May 5, 1936, Serial No. 78,063

3 Claims. (Cl. 65—45)

This invention relates to dining table receptacles, and more particularly to a novel form of combined structure for containing various materials such as sugar, condiments, etc. normally used at the dining table.

An important object of the invention is to provide a novel device of the character referred to wherein several articles and materials commonly used at the dining table are available in a single combined structure.

A further object is to provide a novel form of condiment holder and support therefor.

A further object is to provide a condiment holder shaped to be particularly received in a holder therefor and so shaped that it will not stand alone, thus requiring that it be placed in the holder referred to.

A further object is to provide a condiment holder having a pointed bottom to prevent the holder from standing alone and to provide a support for the holder having a recess corresponding in shape to and adapted to receive the lower end of the condiment holder to support the latter.

A further object is to provide a condiment holder of the character referred to which is adapted to contain two condiments such as salt and pepper whereby either or both of such condiments may be dispensed from the holder.

Other objects and advantages of the invention will become apparent during the course of the following description.

In the drawing I have shown one embodiment of the invention. In this showing:

Figure 1 is a perspective view of the device,

Figure 2 is a central vertical sectional view of the same, and,

Figure 3 is a horizontal sectional view on line 3—3 of Figure 2.

Referring to Figures 1 and 2, the numeral 10 designates a receptacle which may be formed of any suitable material, as will be apparent. In the embodiment of the invention illustrated the receptacle 10 is circular and is provided with suitable handles 11. The receptacle is divided transversely by a partition 12 to provide a pair of semi-circular sections 13 adapted to receive materials commonly used at the dining table. For example, one section 13 may be filled with powdered or granulated sugar as at 14, while the other section may contain lump sugar as at 15. Adjacent each end of the partition 12 pockets 16 may be provided to contain articles such as tooth picks 17, as shown in Figure 1.

A condiment holder 18 is provided for use with the receptacle and the holder is preferably divided vertically by a partition 19 to form compartments 20 adapted to respectively receive condiments such as salt and pepper. The condiment holder is provided at points spaced from its lower end with suitable filling openings closed by plugs 21 of any desired character which may be removed to permit the filling of the compartments 20. The upper end portion of the condiment holder is provided with dispensing perforations 22 and 23 the size of which will be determined by the nature of the condiment to be dispensed. For example, the perforations 22 may be relatively large to dispense salt, while the perforations 23 may be relatively smaller for the purpose of dispensing pepper.

The lower end of the condiment holder 18 tapers to a substantially pointed end 24, as shown in Figure 2. Centrally of its length, the partition 12 is provided with a socket 25 corresponding in shape to and adapted to receive the pointed end 24 of the condiment holder.

The operation of the device will be apparent from the foregoing description. The article is convenient for use on a dining table and different materials such as powdered and lump sugar may be contained in the compartments 14 and 15, while tooth picks 17 may be contained in the openings 16. The pointed end of the condiment holder prevents this device from standing alone on the table and requires that it be replaced in the socket 25 after being used. Thus, in a condiment structure several articles and materials are readily available for use at the dining table, thus rendering the device particularly convenient in use.

The condiment holder provides a single structure adapted to contain two condiments, such as salt and pepper, and such condiments may be separately dispensed by tilting the holder one way or the other, and both condiments may be simultaneously dispensed by inverting the holder. The plugs 21 provide convenient means for filling the compartments of the condiment holder, and such plugs are arranged a sufficient distance from the bottom of the condiment holder so as not to contact with the upper extremities of the socket 25.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a support having a vertical upwardly opening socket tapered to a substantially pointed lower end, and a condiment holder having its lower end tapered to a point for reception within said socket.

2. A device of the character described comprising a receptacle having an open top, a partition dividing said receptacle into sections, said partition having an upwardly opening conical socket, and a condiment holder having a conical pointed lower end for reception in said socket.

3. A device of the character described comprising a receptacle having an open top, a partition dividing said receptacle into sections, said partition having an upwardly opening conical socket, and a condiment holder having a conical pointed lower end for reception in said socket, said condiment holder having a vertical partition dividing it into compartments and being provided adjacent its upper end with perforations communicating with said compartments.

ALVA L. KITSELMAN, II.